United States Patent [19]
Lee et al.

[11] Patent Number: 5,663,274
[45] Date of Patent: Sep. 2, 1997

[54] HEAT-CURABLE COMPOSITIONS BASED ON CYCLIC ISOCYANATE ADDITION PRODUCTS

[75] Inventors: Sze-Ming Lee; Philip E. Yeske; Duane B. Priddy, Jr.; Robert J. Kumpf, all of Pittsburgh; Douglas A. Wicks, Mt. Lebanon, all of Pa.

[73] Assignee: Bayer Corporation, Pittsburgh, Pa.

[21] Appl. No.: 658,787

[22] Filed: Jun. 5, 1996

[51] Int. Cl.$^6$ ................................................ C08G 18/72
[52] U.S. Cl. ................... 528/73; 525/440; 525/457; 525/458; 540/455; 252/182.2
[58] Field of Search ............... 528/73; 252/182.2; 540/455; 525/410, 457, 458

[56] References Cited

U.S. PATENT DOCUMENTS 5,191,038  3/1993  Krabbenhoft et al. ................. 525/462
5,281,669  1/1994  Kambour et al. ...................... 525/177

OTHER PUBLICATIONS

Indian Journal of Technology, vol. 31, Apr.–Jun. 1993, pp. 234–246, entitled "Preparation and ring–opening polymerization of cyclic oligomeric aromatic carbonates."

O. Bayer; Justus Liebigs Ann. Chem.; 549; 1941; p. 287.

*Primary Examiner*—Rachel Gorr
*Attorney, Agent, or Firm*—Joseph C. Gil; Thomas W. Roy

[57] ABSTRACT

The present invention relates to heat-curable, cyclic isocyanate addition products i) which are the reaction products of
  a) a polyisocyanate component having an average isocyanate functionality of two or more and a uretdione group content (calculated as $N_2C_2O_2$, MW 84) of 1 to 30%, based on the weight of the polyisocyanate component, with
  b) a compound containing two or more isocyanate-reactive groups and ii) in which at least 10% by weight of the reaction products are in the form of cyclic groups containing urea and/or urethane groups. The present invention also relates to a process for the preparation of these cyclic isocyanate addition products and to the products obtained by curing these compositions, optionally in the presence of other isocyanate-reactive compounds, at elevated temperatures, e.g., coatings, adhesives, molded articles, elastomers and foams.

20 Claims, No Drawings

HEAT-CURABLE COMPOSITIONS BASED ON CYCLIC ISOCYANATE ADDITION PRODUCTS

BACKGROUND OF THE INVENTION

1. Field of the Invention

The present invention relates to a process for the production of cyclic isocyanate addition products containing uretdione groups, to the resulting isocyanate addition products and to their use for the production of heat-curable coating compositions.

2. Description of the Prior Art

One-component polyurethane coating compositions derived from blocked polyisocyanates and polyols are an important class of materials for applications such as automotive OEM coatings. These one-component compositions are used because of the difficulties encountered when using two-component coating compositions in industrial applications. In the two-component compositions the polyisocyanates are not blocked, which results in several disadvantages. The two-component compositions must be accurately mixed or the properties of the resulting coatings can be substantially affected. In addition, after the components are mixed they have a limited pot life since the components continue to react until an unusable solid is obtained.

These disadvantages are not present in one-component coating compositions containing polyols and polyisocyanates blocked with reversible, monofunctional blocking agents for isocyanate groups. However, there are also disadvantages with one-component coating compositions, which are primarily caused by the volatilization of the blocking agent. The release of the blocking agent can cause blistering and yellowing in thick films and oven fouling. In addition, the blocking agents are considered to be volatile organic compounds (VOCs) in the same manner as organic solvents. Therefore, certain coating compositions may not satisfy environmental regulations solely due to the presence of blocking agents.

It is an object of the present invention to overcome the known disadvantages of one-component coating compositions caused by the presence of blocking agents without affecting the advantages of these coating compositions when compared to two-component coating compositions. This object can be achieved with the one-component compositions according to the present invention which contain special cyclic isocyanate addition products. The isocyanate addition products do not require blocking agents and, thus, do not release blocking agents during cure. The one-component compositions are stable liquid systems at room temperature and yet can be converted to isocyanate addition products under relatively mild thermal conditions without the release of volatile blocking agents.

SUMMARY OF THE INVENTION

The present invention relates to heat-curable, cyclic isocyanate addition products i) which are the reaction products of
  a) a polyisocyanate component having an average isocyanate functionality of two or more and a uretdione group content (calculated as $N_2C_2O_2$, MW 84) of 1 to 30%, based on the weight of the polyisocyanate component, with
  b) a compound containing two or more isocyanate-reactive groups and ii) in which at least 10% by weight of the reaction products are in the form of cyclic groups containing urea and/or urethane groups.

The present invention also relates to a process for the preparation of these cyclic isocyanate addition products by reacting the polyisocyanates and isocyanate-reactive compounds at a molar ratio of 1:3 to 3:1 and at a concentration of the reactive groups of each of the reactants of less than 0.5 equivalents/liter in an inert solvent to form cyclic isocyanate addition products and optionally removing at least a portion of the inert solvent.

Finally, the present invention relates to the products obtained by curing these compositions, optionally in the presence of other isocyanate-reactive compounds, at elevated temperatures, e.g., coatings, adhesives, molded articles, elastomers and foams.

DETAILED DESCRIPTION OF THE INVENTION

The cyclic isocyanate addition products according to the present invention contain cyclic groups corresponding to the formula

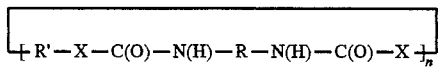

wherein

R' represents the residue obtained by removing two of the isocyanate-reactive groups from a compound having two or more isocyanate-reactive groups, R represents the residue obtained by removing two of the isocyanate groups from a polyisocyanate having two or more isocyanate groups in which at least a portion of these residues contain uretdione groups, X is O, N(H) or N(R") in which R" represents a monovalent hydrocarbon radical and n has a value of 1 to 10, preferably 1 to 6, more preferably 1 to 3 and most preferably 1 to 2.

When difunctional reactants are used for the preparation of the cyclic addition products, formula I represents the structure of the resulting product. However, when one of the reactants is more than difunctional, formula I only represents the cyclic portion of the resulting product. For example, note formula V hereinafter.

The polyisocyanate component used to prepare the cyclic addition products according to the present invention contain uretdione groups (calculated as $N_2C_2O_2$, MW 84) in an amount of 1 to 30% by weight, preferably 5 to 30% by weight and more preferably 8 to 27% by weight. Therefore, in formula at least a portion of the groups "R" contain uretdione groups.

During the conventional reaction of polyisocyanates, e.g., diisocyanates, with compounds containing isocyanate-reactive groups, e.g., diols, one of the isocyanate groups of the diisocyanate reacts with one of the hydroxy groups of the diol to form to an initial reaction product as follows:

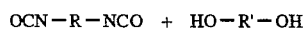

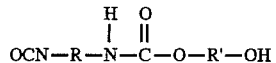

The terminal isocyanate group of the product shown in formula II reacts with a hydroxy group from a different diol molecule and the terminal hydroxy group reacts with an isocyanate group from a different diisocyanate molecule during initial chain extension as follows:

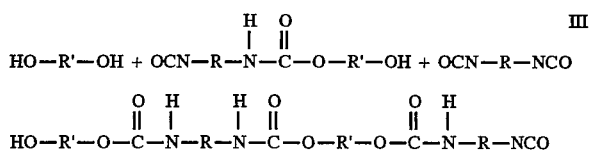

Chain extension continues to form high molecular weight polymers containing the repeating structural unit

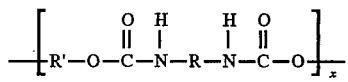

Therefore, the use of higher functional isocyanates or polyols in such a conventional chain extension reaction leads to rapid formation of crosslinked gels, which are insoluble and non-flowable. See, e.g., Odian's *Principles of Polymer Science*, 2nd Ed., Chapter 2, pages 112–123, Wiley & Son, New York 1981.

This is not the primary reaction mechanism that takes place in accordance with the present invention. In the present invention the terminal hydroxy and isocyanate groups of the product of formula II or III or a higher molecular weight oligomer react with each other to form a cyclic reaction product corresponding to formula I in which R is the residue of a diisocyanate and R' is the residue of a diol.

In order for the terminal isocyanate groups and isocyanate-reactive groups to react with each other (unimolecular) and not with other isocyanate-reactive compounds or polyisocyanates via a chain extension reaction (bimolecular), it is necessary to react these components at high dilution, i.e., where the reactive groups of each of the reactants are present at a concentration of less than 0.5 equivalents/liter, preferably less than 0.25 equivalents/liter and more preferably less than 0.1 equivalents/liter. When reacted under these conditions, the percentage of polyisocyanate molecules that react to form cyclic groups is greater than 10%, preferably greater than 20 and more preferably greater than 30%. The remainder of the polyisocyanate molecules undergo chain extension.

Examples of suitable polyisocyanates and compounds containing isocyanate-reactive groups that may be used to prepare the cyclic isocyanate addition products according to the present invention include all of the known compounds that are suitable for use in the preparation of isocyanate addition products, e.g., the compounds presently used for the production of one- and two-component coatings, foams and optionally cellular elastomers.

Examples of suitable polyisocyanates which may be used as the polyisocyanate component include polyisocyanates containing uretdione groups, which may be prepared by any of the known prior art methods, e.g., by catalytic dimerization in the presence of phosphine catalysts. These polyisocyanates may also be prepared in accordance with U.S. Pat. No. 4,929,724 (the disclosure of which is herein incorporated by reference) by dimerizing a portion of the isocyanate groups of an organic diisocyanate in the presence of a dimerization catalyst containing phosphorus-nitrogen bonds and a co-catalyst containing an isocyanate-reactive group and having a pKa-value of at least 6. Another method for preparing these polyisocyanates is through the use of dimerization catalysts which are covalently bound to an insoluble inorganic matrix substrate as disclosed in U.S. Pat. No. 5,315,004 (the disclosure of which is herein incorporated by reference).

Examples of suitable diisocyanates to be used as starting materials for preparing the polyisocyanates containing uretdione groups are those represented by the formula $$R(NCO)_2$$

in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4"-triphenylmethane diisocyanate and polyphenyl polymethylene polyisocyanates obtained by phosgenating aniline/formaldehyde condensates may also be used.

To prepare the polyisocyanate component of the present invention, the polyisocyanates containing uretdione groups may be exclusively used or they may be blended with the previously described monomeric diisocyanates, with other polyisocyanate adducts or with NCO prepolymers, preferably with other polyisocyanate adducts. Suitable polyisocyanate adducts include those containing isocyanurate, biuret, urethane, allophanate, carbodiimide and/or oxadiazinetrione groups. The polyisocyanate adducts have an average functionality of 2 to 6 and an NCO content of 5 to 30% by weight and include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Biuret group-containing polyisocyanates which may be prepared according to the processes disclosed in U.S. Pat. Nos. 3,124,605; 3,358,010; 3,644,490; 3,862,973; 3,903,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

3) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

4) Allophanate group-containing polyisocyanates which may be prepared according to the processes disclosed in U.S. Pat. Nos. 3,769,318, 4,160,080 and 4,177,342, and copending application, U.S. Ser. No. 08/432,285. The allophanate group-containing polyisocyanates have a most preferred NCO content of 12 to 21% by weight and an (average) NCO functionality of 2 to 4.5. Preferred catalysts for the preparation of these polyisocyanates include organic tin(II) salts such as tin(II) octoate.

5) Isocyanurate and allophanate group-containing polyisocyanates which may be prepared in accordance with the processes set forth in U.S. Pat. Nos. 5,124,427, 5,208,334, 5,235,018 and 5,444,146, the disclosures of which are herein incorporated by reference, preferably polyisocyanates containing these groups in a ratio of monoisocyanurate groups to monoallophanate groups of about 10:1 to 1:10, preferably about 5:1 to 1:7.

6) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

7) Polyisocyanates containing oxadiazinetrione groups and containing the reaction product of two moles of a diisocyanate and one mole of carbon dioxide.

Preferred polyisocyanate adducts for use in combination with the polyisocyanates containing uretdione groups are the polyisocyanates containing isocyanurate groups, biuret groups or mixtures of isocyanurate and allophanate groups, especially polyisocyanates containing isocyanurate groups.

The NCO prepolymers, which may be used in combination with the polyisocyanates containing uretdione groups, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH and/or NH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxypolyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaspartates and polyaldimines disclosed in U.S. Pat. No. 5,243,012 and 5,466,771, respectively, herein incorporated by reference.

These NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. In accordance with the present invention NCO prepolymers also include NCO semi-prepolymers which contain unreacted starting polyisocyanates in addition to the urethane group-containing prepolymers.

Suitable compounds containing isocyanate-reactive groups, which may be reacted with the polyisocyanate component containing uretdione groups to form cyclic isocyanate addition products, include the known high and low molecular weight compounds containing isocyanate-reactive groups. The known low molecular weight compounds have a molecular weight of less than 400 and the known high molecular weight compounds having a molecular weight of greater than 400, preferably 400 to 6,000 and more preferably 400 to 3,000. Examples of these compounds include the high molecular weight compounds previously described as suitable for preparing the NCO prepolymers and the low molecular weight compounds disclosed as being suitable for preparing these high molecular weight polyols in the references previously incorporated by reference.

Other examples include the low molecular weight amines such as those disclosed for preparing the high molecular weight polyols in the references incorporated by reference and also the low molecular weight polyaspartates and polyaldimines disclosed in U.S. Pat. Nos. 5,243,012 and 5,466,771, respectively, herein incorporated by reference. A particular advantage for the use of polyaspartates to prepare the isocyanate addition products is that during the subsequent curing of these products the urea groups react to form thermally stable hydantoin groups.

Preferred reactants for preparing the cyclic isocyanate addition products according to the present invention are those having molecular weights of less than 1000, more preferably less than 400. As the molecular weight of the reactants for preparing the cyclic isocyanate addition products increases, the degree of dilution necessary to obtain cyclic products as opposed to chain extended products also increases. Therefore, when preparing cyclic addition products from a high molecular weight NCO prepolymer or from a high molecular weight polyol in which the reactive groups are highly separated, e.g, they are at opposite ends of a polymer chain, it is necessary to use more dilute concentrations of reactants to ensure that cyclization takes place instead of chain extension.

However, it is possible to incorporate high molecular weight reactants into the cyclic isocyanate addition products without using more dilute concentrations. In accordance with one embodiment polymers are prepared having reactive groups in close proximity. For example, by capping a difunctional NCO prepolymer with an excess of a triol (such as glycerol or trimethylolpropane) or a dialkanol amine (such as diethanol amine), the resulting OH functional product will have two hydroxy groups at each end for the subsequent cyclization reaction. Similarly, by esterifying an acid functional polyester with an excess of a triol, a multi-functional product is obtained having hydroxy groups in close proximity. Corresponding isocyanate-functional products can be obtained by reacting compounds containing isocyanate-reactive groups, such as diols or polyols, with a large excess of a triisocyanate, such as the previously disclosed polyisocyanate adducts, to prepare products having two isocyanate groups in close proximity.

In a second embodiment high molecular weight compounds are incorporated into the cyclic addition products after the cyclization reaction. For example, if one mole of a triisocyanate is reacted with one mole of a low molecular weight diol, a cyclization product is obtained that contains one free isocyanate group, i.e., a monoisocyanate. The resulting monoisocyanate can be reacted with a high molecular weight polyol at an NCO:OH equivalent ratio of 1:1 to form a high molecular weight compound containing terminal cyclic groups. Similar products can be made by reacting a diisocyanate with a triol to form a cyclic monoalcohol that can subsequently be reacted with an NCO prepolymer to form a product containing terminal cyclic groups.

A final embodiment for using high molecular weight compounds in accordance with the present invention is to use these compounds as the co-reactant for the cyclic isocyanate addition products as discussed hereinafter.

In accordance with the present invention compounds with unequal functionalities can be reacted at an equivalent ratio of isocyanate groups to isocyanate-reactive groups of about 1:1 to form cyclic isocyanate addition products that contain both cyclic and chain extended isocyanate groups. For example, two moles of a triisocyanate can be reacted with three moles of a compound containing two isocyanate-reactive groups to form a product containing four cyclized isocyanate groups and two chain extended isocyanate groups as follows:

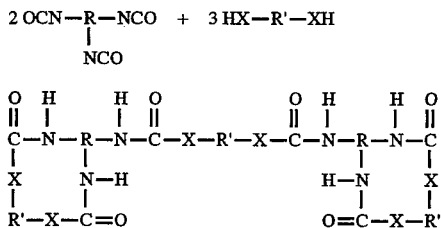

In addition to products corresponding to formula V, this reaction also results in the formation of products containing cyclic groups corresponding to formula I wherein n is greater than 1.

In accordance with the present invention at least 10%, preferably at least 20% and more preferably at least 30%, based on the total weight of the product, is in the form of cyclic groups containing urethane and/or urea groups. For example, the product of formula V contains two cyclic groups corresponding to the formula, —R—NH—C(O)—X—R'—X—C(O)—NH—. The connecting group, i.e., —NH—C(O)—X—R'—X—C(O)—NH—, is not considered to be part of the cyclic group.

Similarly, when an NCO prepolymer is capped with an excess of a trifunctional material and then reacted in a cyclization reaction, the NCO prepolymer is not considered to be pad of the cyclic group. Depending upon the molecular weight of the NCO prepolymer, the resulting cyclization products may approach the lower limit of 10% by weight of cyclic groups, based on the weight of the product. To the contrary when a diisocyanate is reacted with a diol, the entire product can theoretically be in the form a cyclic product. Accordingly, these products can potentially contain at least 30% by weight of cyclic groups.

The cyclic content can be determined by dissolving the reaction product in a suitable organic solvent, such as dimethyl formamide, and then analyzing the solution using a time-of-flight secondary ion mass spectrometer (i.e., the TOF-SIMS method). This procedure is described by D. M. Hercules, *Journal of Molecular Structure*, 1993, 292, p.49–64 and I. V. Bletsos et al, *Macromolecules*, 1987, 20, p. 407–413.

The products according to the present invention have a weight average molecular weight which is preferably not more than 1000% greater, more preferably not more 700% greater than the lowest theoretical molecular weight product obtainable by reacting the polyisocyanate with the isocyanate-reactive compound at an equivalent ratio of isocyanate groups to isocyanate reactive groups of 1:1. To obtain these products, it is necessary for at least 10%, preferably 20% and more preferably 30%, of the isocyanate and isocyanate-reactive groups to be present in cyclic groups as opposed to reacting in a chain extension reaction. For example, in the product of formula V, 67% of the isocyanate groups and 67% of the isocyanate-reactive groups are present in cyclic groups, while the remainder of these groups have undergone chain extension.

The products obtained in accordance with the present invention differ markedly from the products that are conventionally obtained when polyisocyanates and isocyanate-reactive materials are reacted at an equivalent ratio of isocyanate groups to isocyanate-reactive groups of 1:1 as set forth in formula IV. When reacted in this manner less than 0.05% of the isocyanate and isocyanate-reactive groups will be present in cyclic groups such that the resulting product will contain less than 0.1% of cyclic groups, based on the weight of the final product, and will have a weight average molecular weight which is at least 100,000% greater than the lowest theoretical molecular weight product obtainable.

The cyclic isocyanate addition products contain at least one cyclic group. When difunctional reactants are used, e.g., diisocyanates and either diols or diamines, the resulting cyclic isocyanate addition products contain one cyclic group. As set forth in formula V, when triisocyanates and compounds containing two isocyanate-reactive groups are reacted, the resulting cyclic isocyanate addition products contain two cyclic groups. Similar products are obtained when diisocyanates are reacted with compounds containing three isocyanate-reactive groups.

Products containing two cyclic groups are also obtained when compounds containing four isocyanate groups or four isocyanate reactive groups are reacted with compounds containing two isocyanate-reactive groups or two isocyanate groups, respectively. Examples of these types of four-functional compounds have previously been described, e.g., those prepared by reacting a diol with an excess of triisocyanate or by reacting a diisocyanate with an excess of a triol.

Products having the idealized bicylic structure set forth in formula VI below can be obtained by reacting triisocyanates with compounds containing three isocyanate-reactive groups.

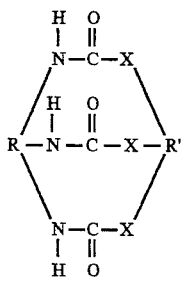

VI

Similarly, compounds containing a tricyclic structure can be obtained by reacting tetraisocyanates with compounds containing four isocyanate-reactive groups.

Due to the presence of uretdione groups in the cyclic isocyanate addition products obtained in accordance with the present invention, these products can optionally be blended with other isocyanate-reactive compounds to form heat curable, one-component coating compositions. When these compositions are subsequently cured at elevated temperatures, the uretdione groups are cleaved to form free isocyanate groups that can react with a co-reactant containing isocyanate-reactive groups.

Suitable co-reactants for the uretdione groups include any of the co-reactants known from polyurethane chemistry. Examples include the isocyanate-reactive compounds that have previously been disclosed for preparing the cyclic isocyanate addition products. The co-reactants are generally present in an amount sufficient to an equivalent ratio of isocyanate groups (each uretdione group forms two isocyanate groups) to isocyanate-reactive groups of 2:1 to 1:2, preferably 1.2:1 to 1:1.2 and more preferably about 1:1.

The amount of these co-reactants will also vary depending upon the content of uretdione groups present in the cyclic isocyanate addition products. When larger amounts of uretdione groups are present in the cyclic addition products, generally larger amounts of co-reactants will also be present, especially when stoichiometric amounts of isocyanate and isocyanate-reactive groups are desired. Similarly, less co-reactant will be present when the uretdione group content is lower.

The heat curable, one-component compositions containing the cyclic isocyanate addition products and the optional co-reactants of the present invention may be used for any application in which reactive two-component systems or one-component systems have previously been used to prepare isocyanate addition products. In this regard one-component systems are intended to include compositions in which either of the reactive components are blocked to prevent the isocyanate addition reaction from occurring. Suitable applications include the production molded and non-molded polyurethane foams, molded elastomers, reaction injection molded optionally cellular elastomers and for the production of coatings and adhesives.

These products may be prepared from the heat-curable compositions by heating these products to a temperature sufficient to decompose or cleave the uretdione groups. It is also possible, generally at higher temperatures, to 1) decompose the urethane and/or urea groups present in the cyclic compounds, reform the isocyanate and isocyanate-reactive compounds, and allow these compounds to react to form high molecular weight isocyanate addition products, and/or 2) initiate a transurethanization reaction to form high molecular weight isocyanate addition products without the formation of free isocyanate groups. Regardless of whether the cyclic compounds are heated to reform isocyanate and isocyanate-reactive groups or to initiate transurethanization, they do not react to reform the cyclic isocyanate addition products since they are not present at high dilution. Instead they react to form high molecular weight polymers similar to those prepared by normal chain extension or cross-linking reactions. The temperature necessary to heat cure these cyclic isocyanate addition products in the absence of a catalyst is generally 80° to 300° C., preferably 100° to 200° C.

When a co-reactant is not present or when an excess of isocyanate groups is present from the cleaved uretdione groups, these isocyanate groups can react with urethane and/or urea groups to form allophanate and/or biuret groups, respectively, to provide additional cross-linking.

The advantages of using the products according to the present invention instead of the known two-component or reactive systems is that no reaction occurs until the compositions are heated above the temperature necessary to reform the initial reactants and/or to initiate a transurethanization reaction. Therefore, there is no time pressure, e.g., to fill a mold before the components have reacted, which is extremely important in the area of reaction injection molding, nor is it necessary to immediately use the components after they have been mixed since the pot life of the composition is not a concern with the products of the present invention.

An additional advantage of the products according to the invention when compared to the known one-component compositions is that they do not require a blocking agent to prevent the components from reacting. Therefore, the previously discussed disadvantages associated with the presence of the blocking agents are avoided.

In addition to the cyclic isocyanate addition products, the compositions may also contain the known additives from polyurethane technology such as blowing agents, fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators and extenders.

The invention is further illustrated, but is not intended to be limited by the following examples in which all parts and percentages are by weight unless otherwise specified.

EXAMPLES

The following starting materials were used in the examples:

Polyisocyanate 1

A mixture containing 70 parts by weight of a uretdione group-containing polyisocyanate, i.e., dimerized 1,6-hexamethylene diisocyanate and 30 parts by weight of N,N', N"-tris-(6-isocyanatohexyl)isocyanurate together with minor quantities of higher homologs of both products. In its 100% solvent free form, the polyisocyanate had an average viscosity of 150 mPa.s at 23° C. and an average NCO content of 22.5% (available from Miles as Desmodur N 3400).

Polyisocyanate 2

A round bottomed flask was charged with 2000 g of isophorone diisocyanate and 30.0g of 4-dimethylaminopyridine. The flask was heated to 50° C. under a nitrogen atmosphere and maintained at that temperature for about 16 hours until the desired isocyanate content of about 27.5% was obtained by titration. Unreacted isophorone diisocyanate monomer was then removed by distillation, which was carried out at 160° C. and 70–180 mTorr in a wiped film evaporator. The resulting had an available isocyanate content of about 37.5%, a free isocyanate content of about 17.5%, a blocked isocyanate content of about 20% from uretdione groups, a monomeric diisocyanate content of about 2.5%, and a viscosity of greater than 200,000 mPa.s at 25° C.

Examples 1 and 2

Syntheses of Cyclic Urea 100 ml of chloroform were stirred in a 3-necked round-bottomed flask fitted with a reflux condenser and a mechanical stirrer. 50 ml solutions of the isocyanate and the co-reactant were prepared separately and filled into two syringes. Using a syringe pump, the syringe contents were added to the reaction flask at room temperature, with vigorous stirring, over 90 min. Upon completion of the addition, 0.1 g of diethylamine was added and the reaction mixture was refluxed for one hour at room temperature. The solvent was then removed with a rotary evaporator under vacuum to give the product in quantitative yields. All the samples were soluble in dimethyl formamide (DMF).

The reactants, concentrations (in moles per liter) and appearance of the resulting products are set forth in the following table.

| Ex. | Isocyanate | conc$^a$./M | co-reactant | conc$^a$./M | appearance |
|---|---|---|---|---|---|
| 1 | Polyiso 1 | 0.400 | diethylene triamine | 0.266 | white solid |
| 2 | Polyiso 2 | 0.400 | piperazine | 0.400 | orange oil |

$^a$Concentration of reactant solution before addition into the reaction flask

Thermal Curing of Cyclics

The cyclic addition products of Examples 1 and 2 were dissolved in chloroform and coated onto KBr plates for IR spectroscopy. No NCO absorption was observed at room temperature. The samples were then heated in a convection oven at 150° C. for 1 hr. The NCO absorption was then observed in the IR spectra indicating that the isocyanate groups had been reformed.

Examples 3 and 4

Syntheses of Cyclic Urethane 1800 ml of chlorobenzene were stirred in a 3-necked round-bottomed flask fitted with a reflux condenser and a mechanical stirrer. 100 ml solutions of the isocyanate and the co-reactant were prepared separately and filled into two syringes. Using a syringe pump, the syringe contents were added with vigorous stirring over 3 hr. to the reaction flask, which was maintained at 75° C. by heating. Upon completion of the addition, 2.5 g of diethylamine was added and the reaction mixture was maintained at 75° C. for 10 min. The solvent was then removed with a rotary evaporator under vacuum to give the product in quantitative yields. All the samples were soluble in dimethyl formamide (DMF).

The reactants, concentrations (in moles per liter) and appearance of the resulting products are set forth in the following table.

| Ex. | Isocyanate | conc$^a$./M | co-reactant | conc$^a$./M | appearance |
|---|---|---|---|---|---|
| 3 | Polyiso 1 | 2.2 | triethanolamine | 1.46 | pale yellow oil |
| 4 | Polyiso 2 | 2.2 | triethanolamine | 1.2 | white solid |

$^a$Concentration of reactant solution before addition into the reaction flask

A drawdown having a wet film thickness of 30 μm was prepared from the cyclic reaction product of Example 4 and cured for 20 min. at 200° C. to form a coating having the following properties:

| MEK double rubs | >100 |
|---|---|
| pencil hardness | 5H |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A heat-curable, cyclic isocyanate addition product
    i) which is the reaction product of
        a) a polyisocyanate component having an average isocyanate functionality of two or more and a uretdione group content (calculated as $N_2C_2O_2$, MW 84) of 1 to 30%, based on the weight of the polyisocyanate component, with
        b) a compound containing two or more isocyanate-reactive groups and
    ii) in which at least 10% by weight of the reaction products are in the form of cyclic groups containing urea and/or urethane groups.

2. The addition product of claim 1 wherein said cyclic groups correspond to the formula

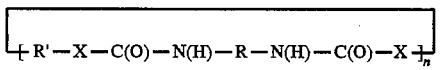

wherein
   R' represents the residue obtained by removing two of the isocyanate-reactive groups from a compound having two or more isocyanate-reactive groups,
   R represents the residue obtained by removing two of the isocyanate groups from a polyisocyanate having two or more isocyanate groups in which at least a portion of these residues contain uretdione groups,
   X is O, N(H) or N(R") in which R" represents a monovalent hydrocarbon radical and
   n has a value of 1 to 10.

3. The addition product of claim 2 wherein R' represents the residue obtained by removing two of the isocyanate-reactive groups from a compound having two or more isocyanate-reactive groups and a molecular weight of less than 400.

4. The addition product of claim 2 wherein R' represents the residue obtained by removing the isocyanate-reactive groups from the reaction product of an NCO prepolymer with a compound having three isocyanate reactive groups at an equivalent ratio of isocyanate groups to isocyanate-reactive groups of 1:3.

5. The addition product of claim 2 wherein R comprises the residue obtained by removing the isocyanate groups from a polyisocyanate adduct having two isocyanate groups and containing uretdione groups.

6. The addition product of claim 3 wherein R comprises the residue obtained by removing the isocyanate groups from a polyisocyanate adduct having two isocyanate groups and containing uretdione groups.

7. The addition product of claim 4 wherein R comprises the residue obtained by removing the isocyanate groups from a polyisocyanate adduct having two isocyanate groups and containing uretdione groups.

8. A heat-curable composition comprising
A) a cyclic isocyanate addition product
   i) which is the reaction product of
      a) a polyisocyanate component having an average isocyanate functionality of two or more and a uretdione group content (calculated as $N_2C_2O_2$, MW 84) of 5 to 30%, based on the weight of the polyisocyanate component, with
      b) a compound containing two or more isocyanate-reactive groups and
   ii) in which at least 10% by weight of the reaction products are in the form of cyclic groups containing urea and/or urethane groups, and
B) an isocyanate-reactive compound.

9. The composition of claim 8 wherein said cyclic groups correspond to the formula

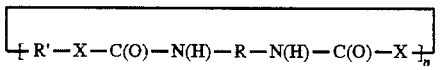   I wherein

R' represents the residue obtained by removing two of the isocyanate-reactive groups from a compound having two or more isocyanate-reactive groups, R represents the residue obtained by removing two of the isocyanate groups from a polyisocyanate having two or more isocyanate groups in which at least a portion of these residues contain uretdione groups, X is O, N(H) or N(R") in which R" represents a monovalent hydrocarbon radical and n has a value of 1 to 6.

10. The composition of claim 9 wherein R' represents the residue obtained by removing two of the isocyanate-reactive groups from a compound having two or more isocyanate-reactive groups and a molecular weight of less than 400.

11. The composition of claim 9 wherein R comprises the residue obtained by removing the isocyanate groups from a polyisocyanate adduct having two isocyanate groups and containing uretdione groups.

12. The composition of claim 10 wherein R comprises the residue obtained by removing the isocyanate groups from a polyisocyanate adduct having two isocyanate groups and containing uretdione groups.

13. A process for the preparation of a heat-curable, cyclic isocyanate addition product in which at least 10% by weight of the reaction product is in the form of cyclic groups containing urea and/or urethane groups which comprises reacting a polyisocyanate having two or more isocyanate groups and a uretdione group content (calculated as $N_2C_2O_2$, MW 84) of 1 to 30%, based on the weight of the polyisocyanate with a compound containing two or more isocyanate-reactive groups at a molar ratio of 1:3 to 3:1 and at a concentration of the reactive groups of each of the reactants of less than 0.5 equivalents/liter in an inert solvent and optionally removing at least a portion of the inert solvent.

14. The process of claim 13 wherein said cyclic groups correspond to the formula

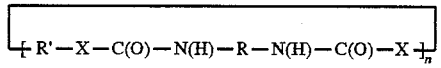   I wherein

R' represents the residue obtained by removing two of the isocyanate-reactive groups from a compound having two or more isocyanate-reactive groups, R represents the residue obtained by removing two of the isocyanate groups from a polyisocyanate having two or more isocyanate groups in which at least a portion of these residues contain uretdione groups, X is O, N(H) or N(R") in which R" represents a monovalent hydrocarbon radical and n has a value of 1 to 10.

15. The process of claim 14 wherein R' represents the residue obtained by removing two of the isocyanate-reactive groups from a compound having two or more isocyanate-reactive groups and a molecular weight of less than 400.

16. The process of claim 14 wherein R' represents the residue obtained by removing the isocyanate-reactive groups from the reaction product of an NCO prepolymer with a compound having three isocyanate reactive groups at an equivalent ratio of isocyanate groups to isocyanate-reactive groups of 1:3.

17. The process of claim 14 wherein R comprises the residue obtained by removing the isocyanate groups from a polyisocyanate adduct having two isocyanate groups and containing uretdione groups.

18. The process of claim 15 wherein R comprises the residue obtained by removing the isocyanate groups from a polyisocyanate adduct having two isocyanate groups and containing uretdione groups.

19. The process of claim 16 wherein R comprises the residue obtained by removing the isocyanate groups from a polyisocyanate adduct having two isocyanate groups and containing uretdione groups.

20. A process for the preparation of an isocyanate addition product which comprises heating the heat-curable, cyclic isocyanate addition product of claim 1 at a temperature sufficient to reform the isocyanate and isocyanate-reactive groups and/or to initiate transurethanization, and cooling the resulting mixture.

* * * * *